United States Patent
Elsperger et al.

(10) Patent No.: US 11,472,639 B2
(45) Date of Patent: Oct. 18, 2022

(54) MOVER FOR A LONGITUDINAL STATOR SYSTEM

(71) Applicant: KRONES AG, Neutraubling (DE)

(72) Inventors: Stefan Elsperger, Soechtenau (DE); Hartmut Davidson, Zeitlarn (DE); Manfred Kieslinger, Stephanskirchen (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/252,239

(22) PCT Filed: Mar. 15, 2019

(86) PCT No.: PCT/EP2019/056536
§ 371 (c)(1),
(2) Date: Dec. 14, 2020

(87) PCT Pub. No.: WO2019/238284
PCT Pub. Date: Dec. 19, 2019

(65) Prior Publication Data
US 2021/0253373 A1    Aug. 19, 2021

(30) Foreign Application Priority Data

Jun. 15, 2018 (DE) .................. 10 2018 209 724.0

(51) Int. Cl.
*B65G 54/02* (2006.01)
*H02K 41/03* (2006.01)

(52) U.S. Cl.
CPC .......... *B65G 54/025* (2013.01); *H02K 41/031* (2013.01); *B65G 2203/0283* (2013.01)

(58) Field of Classification Search
CPC ....... B65G 54/02; H02K 41/031; B60L 13/04; B60L 13/06; B60L 13/08
See application file for complete search history.

(56) References Cited

U.S. PATENT DOCUMENTS

| | | | | |
|---|---|---|---|---|
| 4,825,773 | A * | 5/1989 | Morishita | B61B 13/08 104/284 |
| 6,777,832 | B2 * | 8/2004 | Watanabe | H02K 41/031 310/12.24 |
| 6,906,789 | B2 | 6/2005 | Carter et al. | |
| 11,117,758 | B2 * | 9/2021 | Kleinikkink | H02K 7/08 |
| 2015/0028699 | A1 | 1/2015 | Hofstetter et al. | |

FOREIGN PATENT DOCUMENTS

| | | |
|---|---|---|
| DE | 102014202785 A1 | 8/2015 |
| JP | 2007190619 A | 8/2007 |
| JP | 2010057280 A | 3/2010 |
| WO | 2018161160 A1 | 9/2018 |

OTHER PUBLICATIONS

ISA European Patent Office, International Search Report Issued in Application No. PCT/EP2019/056536, dated Jun. 25, 2019, WIPO, 2 pages.

* cited by examiner

*Primary Examiner* — William R Harp
(74) *Attorney, Agent, or Firm* — McCoy Russell LLP

(57) ABSTRACT

The present invention relates to a mover for a longitudinal stator system, comprising a primary part with elements for movably arranging the mover on a longitudinal stator and an accommodating area, in which a sensor for position-dependent measurement of at least one system parameter is arranged, the sensor being releasably connected to the accommodating area, and to a corresponding method for determining a system parameter of a longitudinal stator system.

13 Claims, 7 Drawing Sheets

MOVER FOR A LONGITUDINAL STATOR SYSTEM

CROSS REFERENCE TO RELATED APPLICATIONS

The present application is a U.S. National Phase of International Application No. PCT/EP2019/056536 entitled "MOVER FOR A LONGITUDINAL STATOR SYSTEM," and filed on Mar. 15, 2019. International Application No. PCT/EP2019/056536 claims priority to German Patent Application No. 10 2018 209 724.0 filed on Jun. 15, 2018. The entire contents of each of the above-listed applications are hereby incorporated by reference for all purposes.

TECHNICAL FIELD

The present invention relates to a mover for a longitudinal stator system as well as to a method for determining a system parameter of a longitudinal stator system.

BACKGROUND AND SUMMARY

Longitudinal stator systems are known from the prior art. They consist of an elongate stator (configured as a guide rail, by way of example) and of one or a plurality of carriages, so-called movers, which are able to move along the longitudinal stator system under the influence of a magnetic force. In these systems, the movement of the mover along the longitudinal stator and also, in particular, in the area of switches is controlled by adjusting the magnetic forces acting on the mover.

Although the magnetic fields which determine the magnetic force are usually reliably generated by the coils in the longitudinal stator, the magnetic forces acting on the mover also depend on other system parameters that can hardly be controlled or are difficult to control.

Task

Therefore, the present invention is based on the task of allowing an exact determination of system parameters of a longitudinal stator system in order to improve the control accuracy of the movement of the movers.

Solution

This task is solved by the mover for a longitudinal stator system and the method for determining a system parameter of a longitudinal stator system according to the embodiments described.

The mover for a longitudinal stator system according to the present invention comprises a primary part with elements for movably arranging the mover on a longitudinal stator and an accommodating area, in which a sensor for position-dependent measurement of at least one system parameter is arranged, wherein the sensor may be releasably connected to the accommodating area.

The primary part can basically be regarded as any structure that is part of the mover and includes the moving elements. Frame structures may here be used as primary parts, by way of example, the frames being also adapted to have inserted therein secondary parts which will be described hereinafter.

The position-dependent measurement of the system parameter refers to the measurement of the system parameter in such a way that conclusions can be drawn with respect to the position of the mover relative to the longitudinal stator, e.g. by storing measurement pairs in the form of the "position value of the system parameter". The system parameter may e.g. be a magnetic force acting on the sensor, or the distance of the sensor to the longitudinal stator along which the mover runs. Also other parameters, which characterize the system consisting of the longitudinal stator and the mover and which are in particular relevant for the magnetic force acting on the mover, can be determined by suitable sensors.

According to an embodiment, the sensor comprises a load cell, which is connected to the mover in a stationary manner, and a secondary element corresponding to a secondary part of the mover as regards its geometry and/or its magnetic force exchangeable with the longitudinal stator during operation, wherein the load cell is able to measure a force acting on the secondary element when the mover moves along the longitudinal stator under the influence of a magnetic force.

The secondary part of the mover is considered to be the standard element built into the mover. This is normally a magnet or a magnetizable material, which is acted upon by the magnetic force caused by the longitudinal stator and through which the drive of the mover along the longitudinal stator is effected in the final analysis. According to a special possibility provided here, the secondary part may be identical to the secondary element and only the normally provided suspension/connection of the secondary part from/to the primary part may be replaced by the load cell. In any case, the secondary element is configured such that it can be connected to the load cell. This embodiment allows the magnetic forces acting on the mover to be measured under conditions that would otherwise also occur during normal operation, since the mover as such, and in particular the primary part, can be configured like a mover normally used with the longitudinal stator and since the installation of the load cell with the secondary element only leads to minor changes to the system in comparison with such a conventional mover.

According to a further development of this embodiment, the position of the load cell relative to the primary part can be adjusted by means of adjustment elements. Such adjustment elements may be used for compensating possible tolerance deviations of all the components involved, so that a geometrical position that is as ideal as possible and a position that is ideal with respect to the forces acting can be adjusted. These adjustment elements may e.g. be washers, screws, spacers and the like. In this way, minor deviations can be compensated for when installing the load cell.

According to a further development of these embodiments, the distance between the mover and the longitudinal stator perpendicular to the plane of movement of the mover corresponds, in a condition in which the mover is arranged on the longitudinal stator, to the normal distance between the mover with the installed secondary part and the longitudinal stator. This means that also the distance of the mover and in particular of the secondary element and of the load cell to the longitudinal stator is identical to the mover used normally in connection with the longitudinal stator, so that also the magnetic force depending, as a matter of principle, on the distance to the longitudinal stator can be measured very precisely for real operation.

According to a further development, the load cell is configured for measuring, in both directions perpendicular to the plane of movement of the mover along the longitudinal stator, a force acting on the secondary element. This embodiment is advantageous in particular when system parameters are measured in the area of a switch of the longitudinal stator system, since the magnetic force acting on the mover from the longitudinal stator, on which the mover moves first, and from the longitudinal stator, onto which the mover is transferred in the area of the switch, can be measured exactly.

According to an alternative embodiment, the sensor comprises a distance meter for measuring the distance between the mover and the longitudinal stator perpendicular to the plane, in which the mover can move along the longitudinal stator during operation. The size of the air gap between the mover and the longitudinal stator can thus be measured very precisely, and possible manufacturing or adjustment errors can be detected. In areas where, for example, a mover runs along the longitudinal stator at a greater distance therefrom, the coils of the longitudinal stator can be controlled in such a way that the greater distance is compensated by a stronger magnetic field, so as to avoid speed losses of the mover.

According to a further development of this embodiment, the distance meter comprises one of one or a plurality of sensing rollers and/or one of one or a plurality of sensing pins. Sensing rollers allow an accurate measurement of the distance even while the mover is moving along the longitudinal stator. Sensing pins, however, ensure an even more accurate distance measurement, but are used when the mover is at a standstill, since otherwise the longitudinal stator may be damaged, if it is in contact with the sensing pin while the mover is moving along the longitudinal stator.

Furthermore, the mover may comprise a position determination system, which is configured for determining a position of the mover along the longitudinal stator. The exact position of the mover can thus be assigned to the values measured by the sensor for one or a plurality of system parameters. This allows creating a "map" of the system parameter depending on the position of the mover on the longitudinal stator for future use. To this end, a starting position can be defined once/several times.

According to a further embodiment, the mover comprises an evaluation electronics for processing at least the measurement values recorded by the sensor. The system parameters measured by the sensor and/or the additionally measured position can thus be evaluated in real time, so that such a mover may possibly also be used routinely during operation of the longitudinal stator system, so as to check compliance with the system parameter tolerance. Furthermore, data transmission units, such as wireless connections, which may have a negative influence on the longitudinal stator system, are no longer necessary.

The method according to the present invention used for determining a system parameter of a longitudinal stator system comprises the use of a mover comprising a primary part with elements for movably arranging the mover on a longitudinal stator and an accommodating area, in which a sensor for position-dependent measurement of the system parameter is arranged, the sensor being releasably connected to the accommodating area, and the mover being arranged on the longitudinal stator, and the sensor measuring at least one system parameter while the mover is arranged on the longitudinal stator.

In addition, the sensor may measure the system parameter while the mover is moving along the longitudinal stator. This "measuring mover" can thus be used during normal operation of the longitudinal stator system without major interruptions.

According to a further embodiment, the sensor comprises a load cell, which is connected to the mover in a stationary manner, and the sensor further comprises a secondary element corresponding to a secondary part of the mover as regards its geometry and/or a magnetic force exchangeable with the longitudinal stator during operation, the load cell measuring a force acting on the secondary element when the mover moves along the longitudinal stator under the influence of a magnetic force. An exact determination of the changes in the magnetic force occurring along the longitudinal stator and acting on a mover can thus be guaranteed.

Alternatively, the sensor may measure the distance between the mover and the longitudinal stator by means of a distance meter for measuring the distance between the mover and the longitudinal stator perpendicular to the plane in which the mover moves along the longitudinal stator. The air gap, which exists between the mover and the longitudinal stator and which can have a substantial influence on the magnetic force acting on the mover, can thus be determined reliably.

In addition, the values for the system parameter measured by the sensor may be processed by means of an evaluation electronics of the mover. This allows real-time evaluation and thus monitoring of the real operation of the long stator system.

Furthermore, the position of the mover during a movement along the longitudinal stator may be determined by means of a position determination system. This allows the system parameter to be assigned to the position of the mover relative to a reference point on the longitudinal stator.

DETAILED DESCRIPTION

Figure 1:
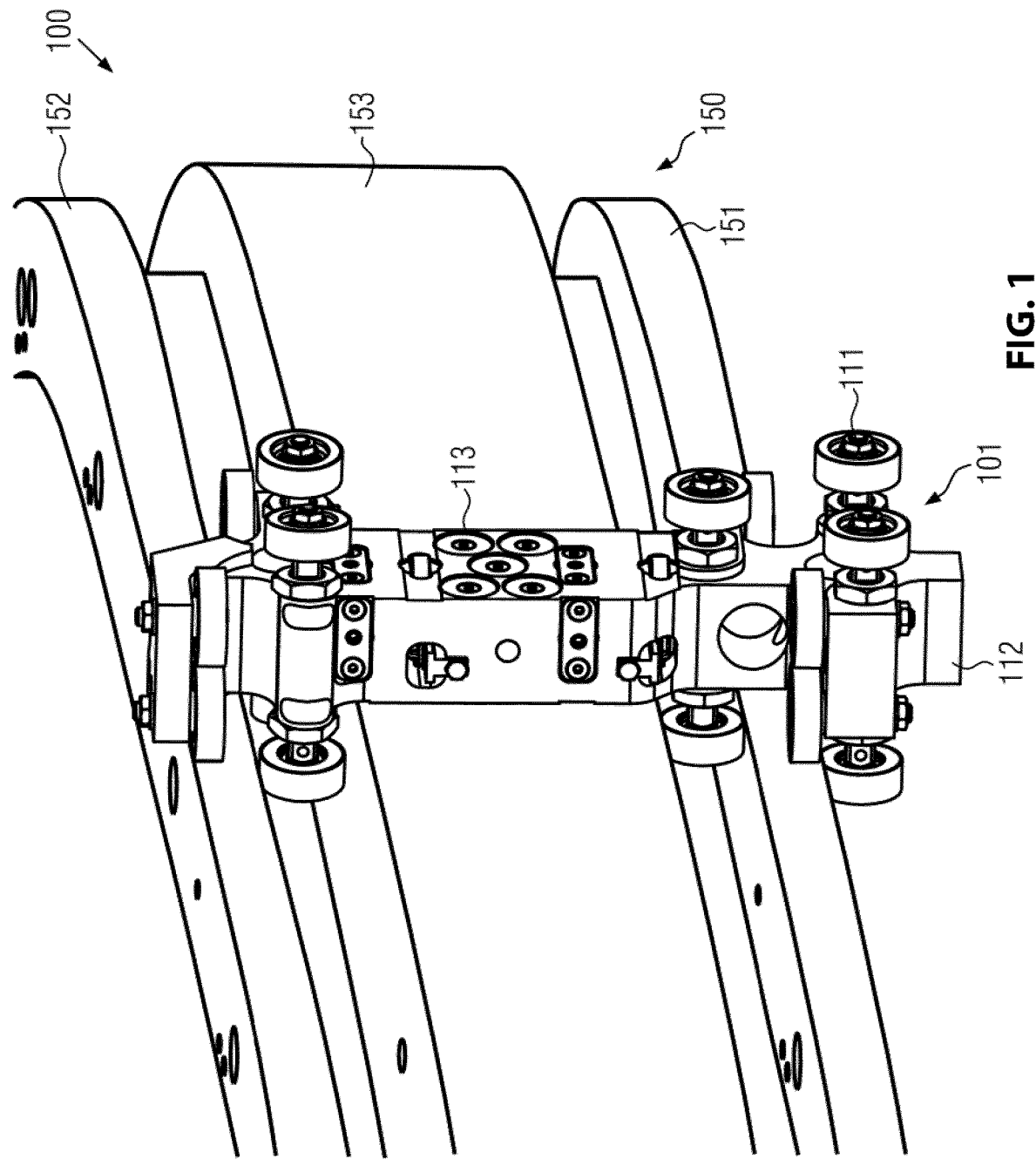
FIG. 1 shows a schematic representation of a longitudinal stator system according to an embodiment.

FIG. 1 shows a schematic representation of a longitudinal stator system 100 of the type adapted to be used in conveying units of the beverage processing industry, e.g. for conveying containers, such as bottles. The longitudinal stator system comprises a longitudinal stator 153, which may be elongate in shape or exhibit a closed geometry. The longitudinal stator may be delimited above and below two guide rails 151 and 152. Between the longitudinal stator 153 and each of the guide rails 151 and 152, a free space for movably arranging a mover may be provided in the embodiment shown here.

In the embodiment shown here, the mover 101 comprises a primary part 112 having arranged thereon elements 111 for movably arranging the mover on the longitudinal stator and/or the guides 151 and 152. These elements 111 may preferably be rotatable rollers that can be fitted into the gap between the longitudinal stator 153 and the respective guides 151 and 152.

The mover 101 comprises, in addition to the primary part 112, an accommodating area 113, which is adapted to have inserted therein a sensor and a secondary part of the mover in a replaceable manner. The accommodating area 113 may also be provided in the form of a recess in the primary part 112 of the mover. It may, however, also be an additional component for receiving therein the sensor or the secondary part that can be connected to the primary part via suitable connections, such as screws.

The secondary part is usually a body consisting of or comprising a magnetizable material or a magnet. When the mover 101 is used during operation of the longitudinal stator system, this body is used for causing the mover to be driven along the longitudinal stator 153 due to the magnetic field generated by the longitudinal stator. The secondary part may comprise one or a plurality of magnets. The latter may be screwed to the primary part or connected thereto in some other way.

Figure 2:
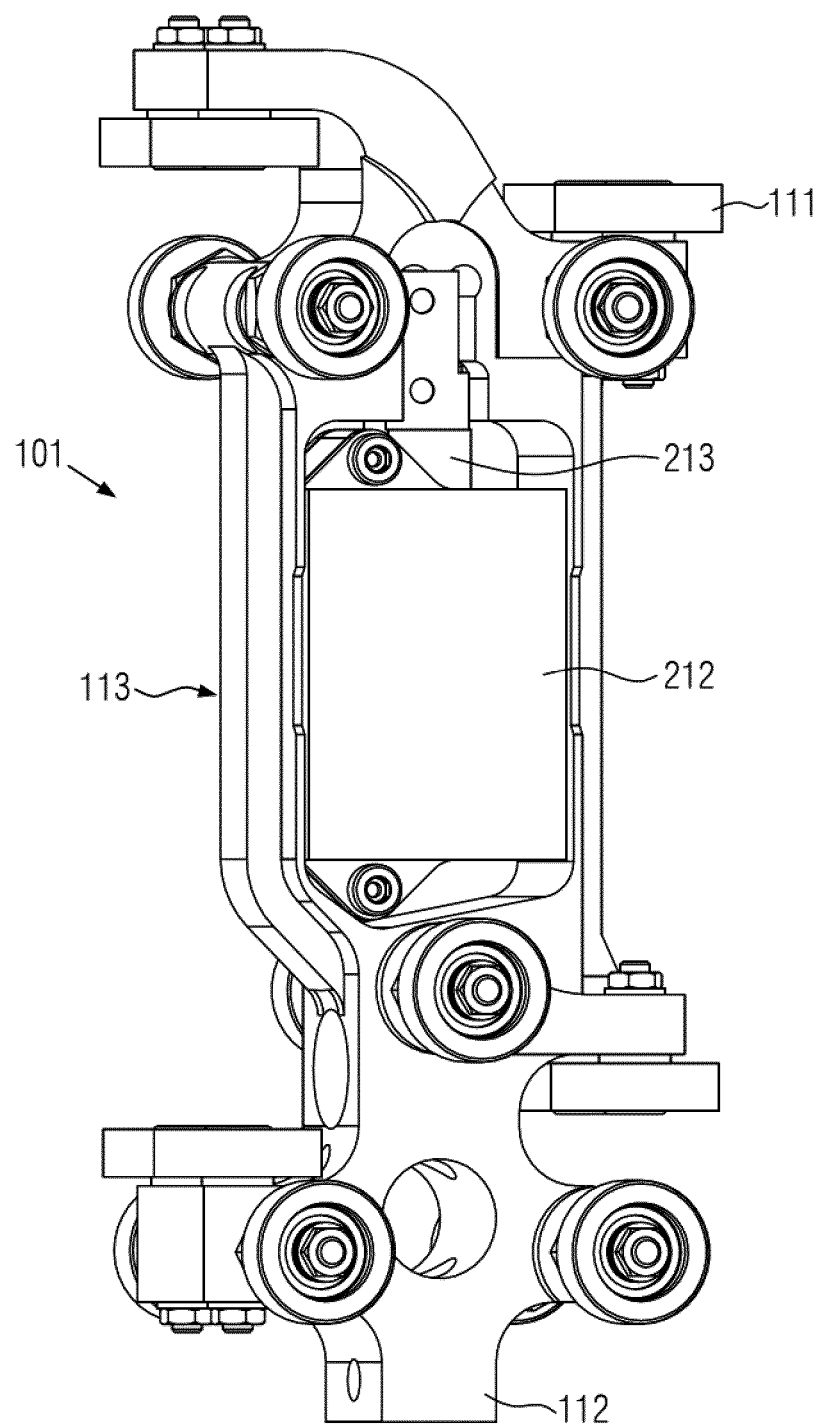
FIG. 2 shows a detailed schematic view of a mover of FIG. 1 according to an embodiment.

FIG. 2 shows a schematic view of a mover 101 disclosed by the present invention according to an embodiment. Also this mover comprises the primary part, which has already been described and in which the accommodating area 113 is arranged. The primary part also comprises the elements for movably arranging the mover on the longitudinal stator, which are here shown in the form of rollers.

In the embodiment shown, a sensor comprising a load cell 213 and a secondary element 212 is arranged in the accommodating area 113. The secondary element may be configured such that it substantially corresponds to the secondary part as described in the case of the embodiment according to FIG. 1. This concerns in particular its geometry, weight and magnetic properties, in particular the magnetic permeability and susceptibility. According to the present invention, the secondary element 212 is connected to the load cell 213 such that a magnetic force acting on the secondary element 212, in particular a magnetic force caused by the longitudinal stator of the longitudinal stator system in FIG. 1, can be measured by the load cell 213 through a force acting on the latter. In this way, the magnetic force acting on the secondary element can be determined depending on the position of the mover on the longitudinal stator. For a position-dependent determination of the magnetic force acting on the mover 101, as an example of a system parameter, the mover may additionally have assigned thereto a position determination system, which is not shown here. The measurement values determined by the load cell and the positions determined by the position determination system can be evaluated with the aid of an evaluation electronics (provided e.g. on the mover or externally thereof) and used for indicating the magnetic force depending on the position on the longitudinal stator. Also other applications of the measured values for the position and the magnetic force (or a system parameter in general) are imaginable. These values may, for example, be used in the control of the mover during normal operation (e.g. for conveying containers).

Preferably, the sensor, or the load cell in the case of FIG. 2, may comprise a Wheatstone bridge, in the case of which one of the resistors in the voltage divider is force-dependent. Its resistance then changes from a zero position (which may correspond to a value equal to zero of the acting forces) depending on the force transmitted to the resistor by the secondary element 212, which, in the event that the sensor is configured to include a load cell as in FIG. 2, is a measure for the magnetic force acting on the secondary element.

Figure 3:
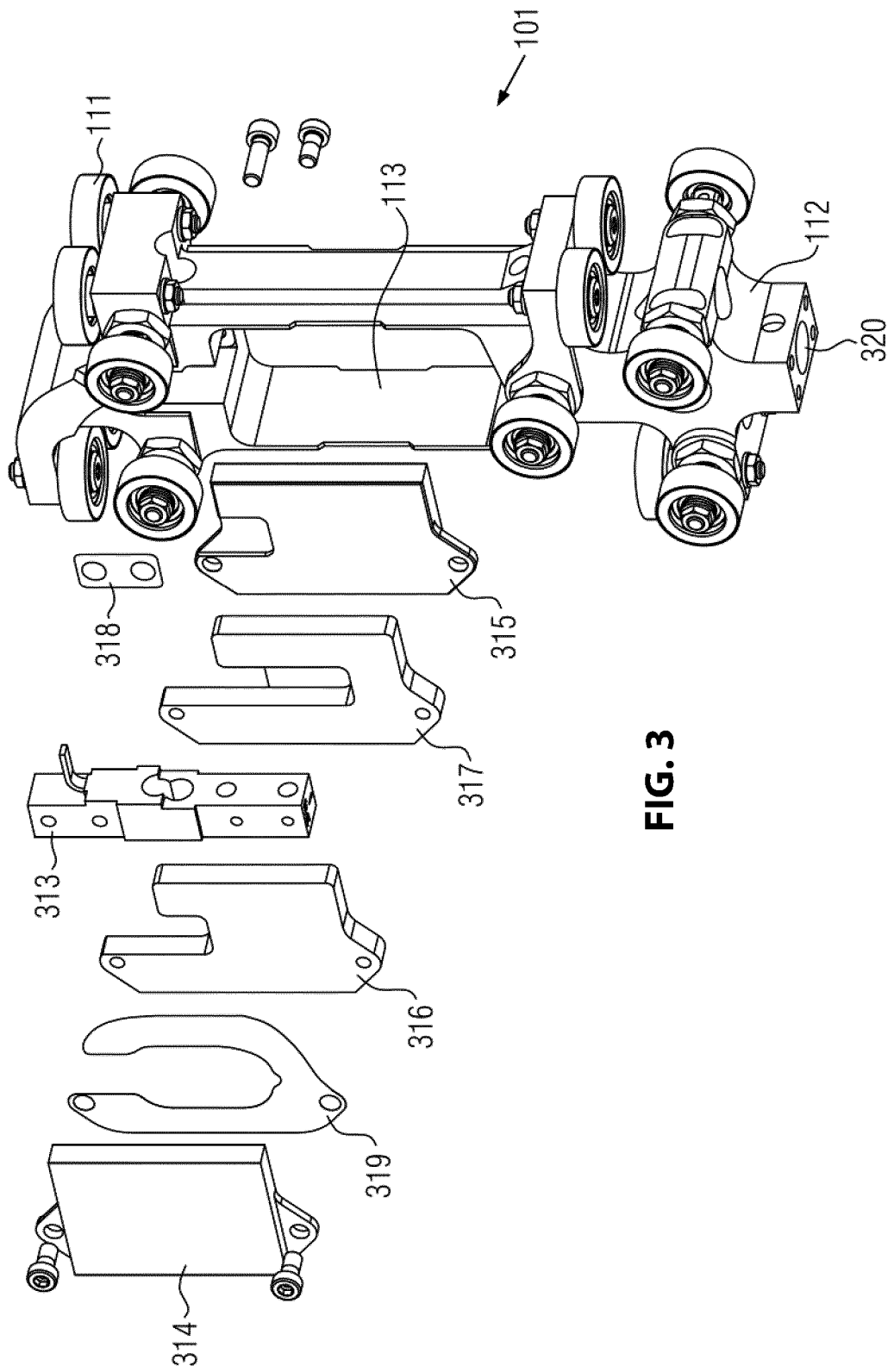
FIG. 3 shows an expression view of the mover shown in FIG. 2.

FIG. 3 shows an exploded view of the mover of FIG. 2. What is here particularly shown is the structural design of the secondary element and its connection to the load cell 313 outside the accommodating area 113. As shown here, the secondary element may comprise a plurality of components. For example, magnetizable elements 314 and 315 may be provided on two sides located opposite the load cell 313, the function of these elements being identical to that of the secondary part (see above). Hence, these elements are e.g. magnetic or magnetizable materials that can interact with the magnetic field generated by the longitudinal stator and thus cause propulsion of the entire mover. As regards geometry and magnetic properties, they can, on their own, correspond to the geometry and the magnetic properties of a secondary part for the mover.

In addition, one or a plurality of adapters 317 and 319 may be provided, via which the elements 314 and 315 can be connected to the load cell 313. In order to make the external dimensions of the entire sensor, which is inserted in the accommodating area 113, as similar as possible to those of a secondary part for the mover, one or a plurality of spacer plates 319 may be provided, so that also the volume of the sensor in its entirety can be adapted to a secondary part for the mover to be used. In this way, it can also be ensured that in the case of different secondary parts used, which may e.g. differ in width, the respective sensor used can have a similar or identical geometry.

The load cell may be configured as a force gauge or a spring-type force gauge. Embodiments making use of a Wheatstone bridge, which have already been described in connection with FIG. 2, but also in general without special reference to a load cell, are, however, preferably used. The load cell itself must be connected to the primary part 112 in the accommodating area 113. To this end, one or a plurality of elements, e.g. screws or spacers or click connections, can be used, which allow in addition a precise adjustment of the position of the load cell and thus also of the secondary element. The load cell as such is preferably connected to the primary part 112 in a stationary manner, so that it will not move, not even when a magnetic force is applied through the longitudinal stator, which could otherwise result in a corruption of the measured system parameters, and in particular of the magnetic force acting on the secondary element.

In the embodiment shown here, the elements 314 and 315 are located on both sides of the load cell. The magnetic force acting on the mover in its entirety can thus be measured reliably not only in one direction, it being thus possible to use the mover for measuring system parameters, in particular the magnetic force acting thereon also in the area of switches, where a magnetic field is created by longitudinal stators on two opposed sides of the mover. This structural design of the sensor, and in particular of the secondary element thereof, is, however, not mandatory. For example, it is also possible to arrange only one magnetizable element 314 on one side of the load cell, if measurement of the system parameters is desired on this side only.

Figure 4:
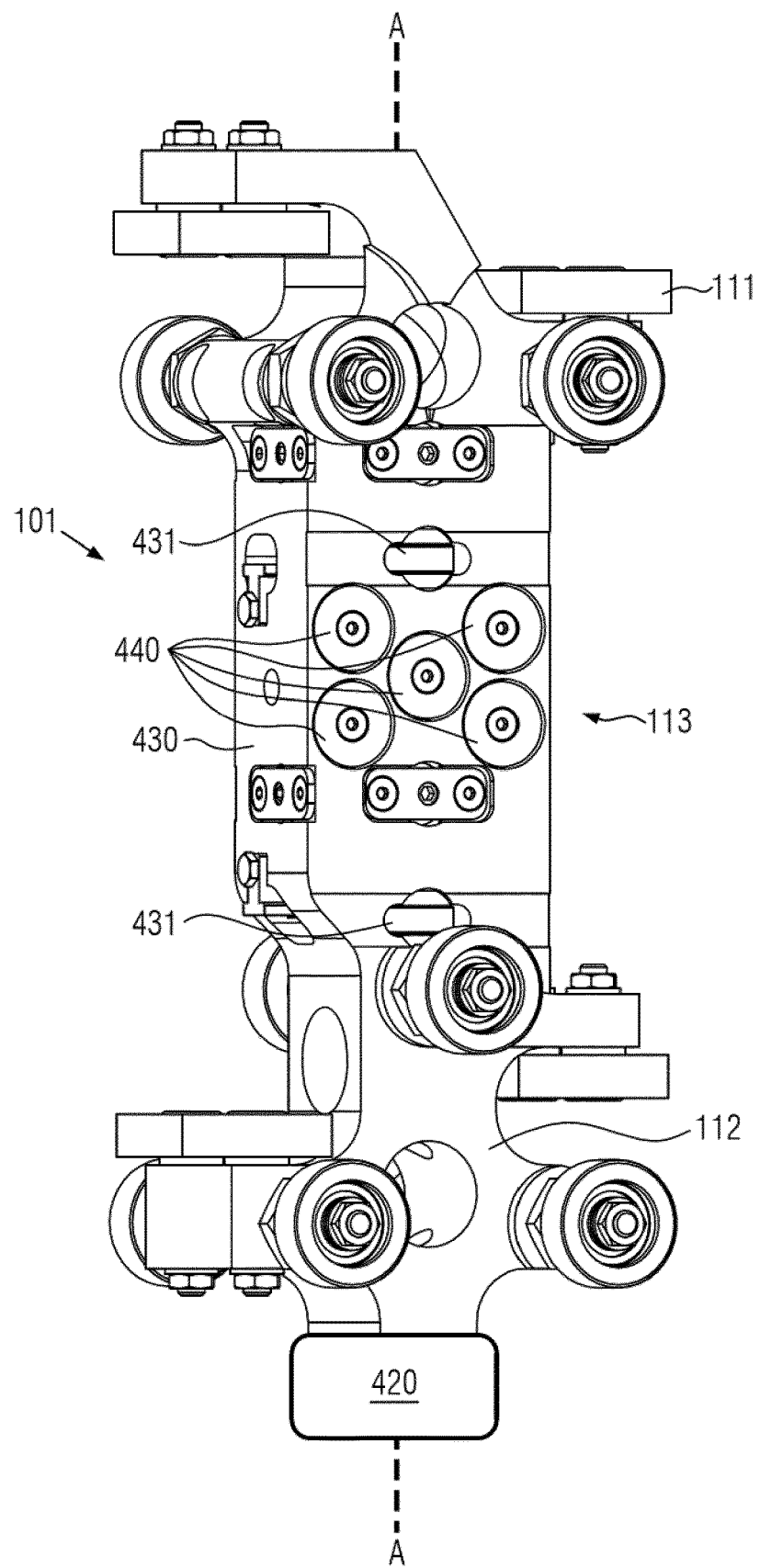
FIG. 4 shows a mover according to a further embodiment disclosed by the present invention.

FIG. 4 shows a further embodiment of the mover 101. The outer design, in particular of the primary part 112, and the elements for movably arranging the mover on a longitudinal stator 111 may here be identical to the preceding embodiments. Since an important advantage of the present invention is to be seen in that only the elements in the accommodating area 113 have to be exchanged, so as to be able to make use of the mover not only in the usual way in the longitudinal stator but also for measuring system parameters of the longitudinal stator system, also the accommodating area 113 is preferably identical to the preceding embodiments.

In contrast to the embodiment described in FIGS. 2 and 3, the sensor in FIG. 4 is configured as a distance meter for measuring the distance between the mover and the longitudinal stator at least perpendicularly to the plane in which the mover can move along the longitudinal stator during operation. For this purpose, the distance meter may comprise e.g.

one or a plurality of sensing rollers 431. These rollers are arranged in the accommodating area 113 and, when the mover is arranged on the longitudinal stator, they are in contact with at least part of the longitudinal stator housing. This will be described in more detail in FIGS. 6a and 6b.

In addition to the distance meter 431, one or a plurality of magnets 440 may be arranged in the accommodating area 113, either as part of the sensor or additionally, so that the mover can be moved along the longitudinal stator by applying a magnetic field to the longitudinal stator. Preferably, the sensor can measure the distance to the longitudinal stator with the distance meter during the movement. Embodiments that are particularly suitable for this purpose are those providing rollable elements, such as sensing rollers, as part of the distance meter. Alternatively, the distance meter may also be configured such that it can determine the distance to the longitudinal stator only when the mover is at a standstill. In this case, sensing pins may especially be used.

If the distance between the mover and the longitudinal stator is to be determined while the mover is in motion, the preferred embodiment will be one in which additional magnets 440 are arranged in the accommodating area 113, since this will allow a controlled movement of the mover. If the distance is to be determined only when the mover is at a standstill, such magnets 440 need not necessarily be provided, since also manual positioning of the mover is possible. However, magnets 440 may also be provided in the case of this embodiment, since, irrespectively of the design of the distance meter, a movement of the mover to specific positions will then be possible along the longitudinal stator with the aid of a migrating magnetic wave and a contact between the mover and the longitudinal stator can be guaranteed by the magnetic force directed perpendicular to the direction of movement.

FIG. 4 shows, schematically, also an evaluation electronics 420 as part of the mover. This evaluation electronics may comprise a storage medium, in particular a non-volatile memory, and in addition a processing unit connected to the sensor and a possibly provided position determination system for the purpose of data exchange. An evaluation of the measured system parameters can thus take place directly in the mover. This evaluation can then be read and/or evaluated, e.g. after the end of the entire measuring process, by connecting the evaluation electronics to a computer for data exchange (in a wireless manner by means of WLAN or via USB, by way of example) and transmitting the measured data to the computer on which the data can then be evaluated still further.

If, during the measurement process of the system parameters by means of the mover, a connection for data exchange with a central monitoring unit is provided additionally or alternatively, real-time monitoring of the system parameters measured by the mover and the sensor, respectively, can take place depending on the position of the mover relative to the longitudinal stator. This allows the mover to be used e.g. also during operation with the sensor and to be moved along the longitudinal stator, in addition to movers equipped with a conventional secondary part, so that the system parameters can be recorded continuously.

Figure 5:
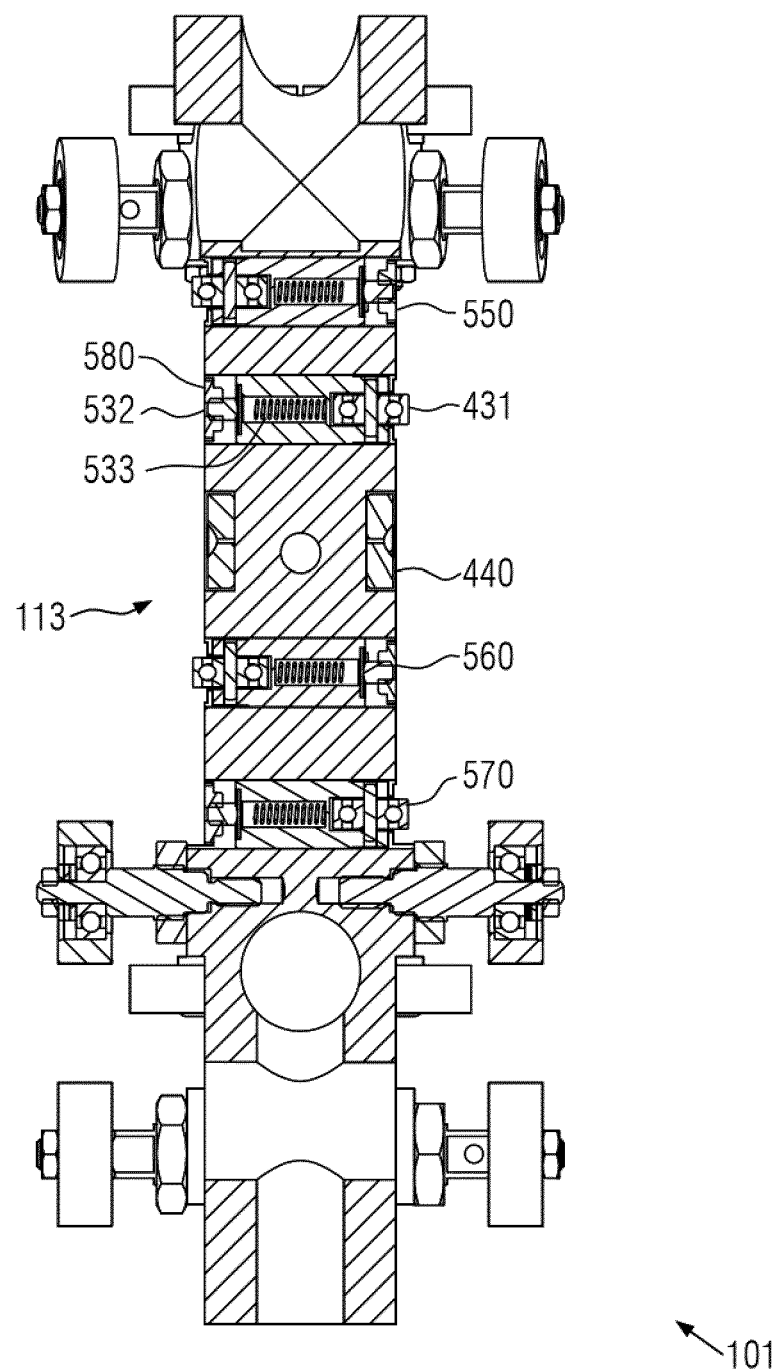
FIG. 5 shows a section along the A-A plane through the mover according to FIG. 4.

FIG. 5 shows a section transversely through the A-A plane of the mover shown in FIG. 4, i.e. along the center line of the mover. As can be seen, the sensor comprises here four distance meters 550 to 580. Each of these distance meters comprises, in one embodiment, a contact area, e.g. a sensing roller 431 shown here, with which the surface of the longitudinal stator can be contacted. This sensing roller 431 is preloaded against the surface of the longitudinal stator housing by a spring element 533, so that the sensing element will always be in contact with the longitudinal stator. Furthermore, an adjusting element 532 may be provided for adjusting the preload through the spring element. This may e.g. be a screw, around which part of the spring is wound, and the preload of the spring can be increased or decreased, depending on the rotational position of the screw.

According to the embodiment shown in FIG. 5, the mover 101 comprises two distance meters 550 and 560, which are directed towards the left side in the present figure and which are able to measure the distance to the longitudinal stator in this direction. The other distance meters 570 580 are able to measure the distance to a guide located on the other side or to a stator or longitudinal stator located on the other side. The distance can be determined directly, e.g. via a Wheatstone bridge of the type that has already been described hereinbefore, and transmitted to a suitable monitoring unit. To this end, one of the resistors in the voltage divider of the Wheatstone bridge is, in the present embodiment, provided such that, starting from a defined zero position, its resistance value will change depending on the distance between the mover and the longitudinal stator.

However, other embodiments, in particular those making use of an electronic measuring tape, are here imaginable as well. In principle, the distance measurement allows the determination of the size of the air gap between the longitudinal stator and the mover, provided that a zero point of the distance is defined in a suitable manner directly on the surface delimiting the surface of the mover. This size is particularly relevant for drawing conclusions with respect to the magnetic forces which are effective at this distance and which, in the final analysis, determine the movement of the mover.

While in the embodiment shown here, sensing rollers 431 have been described, sensing pins may also be used instead. The spring elements 533 may be configured as mechanical springs. However, other embodiments comprising flexible elements are imaginable as well.

Figure 6A:
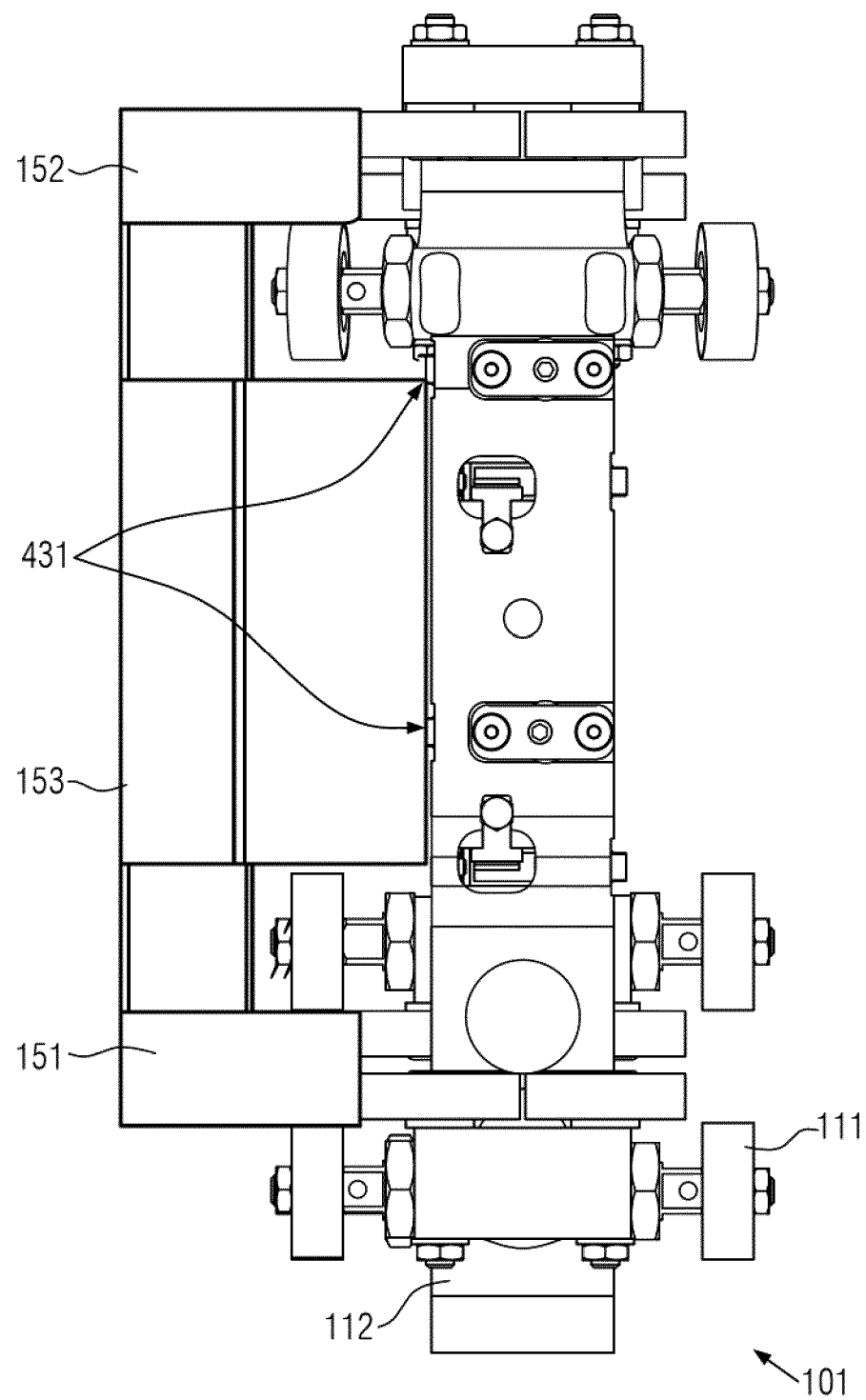
FIG. 6a+b show a mover on a guide rail (FIG. 6a) and a mover in the area of the switch (FIG. 6b).

FIG. 6a shows a cross-section through a longitudinal stator and a mover moving thereon, along a plane perpendicular to the direction of movement of the mover. The mover 101 is configured analogously to the mover described in FIG. 4 and FIG. 5. In this embodiment, sensing rollers and the additional elements, such as spring elements, described in FIG. 5 are used as distance meters. As can be seen, the sensing rollers run along the longitudinal stator at two points, thus allowing a precise determination of the distance of the outer plane, which is defined by the longitudinal stator and which is directed towards the mover. In addition, an angle that may be enclosed by the longitudinal stator and the mover can be determined in this way, so as to allow conclusions to be drawn with respect to possibly incorrect orientations of the longitudinal stator relative to the described guides along which the mover runs.

The mover runs along the guides 151 and 152, which extend above and below the longitudinal stator, the rollers 111 resting thereagainst. It follows that, in addition to the determination of the size of the air gap between the longitudinal stator and the mover, and in particular the secondary part, which, in the final analysis, is acted upon by the magnetic fields generated by the longitudinal stator, so as to cause the propulsion of the mover, also the orientation of the components of the longitudinal stator system relative to one another can be checked.

The embodiment shown in FIG. 6a cannot only be realized with the distance meter as a sensor, but also with the embodiments of the mover described in FIG. 2 and FIG. 3, which comprise a load cell and a suitable secondary element for determining the magnetic forces acting on the secondary element, thus allowing conclusions to be drawn with respect to the forces acting on a mover with a conventional secondary part.

Figure 6B:
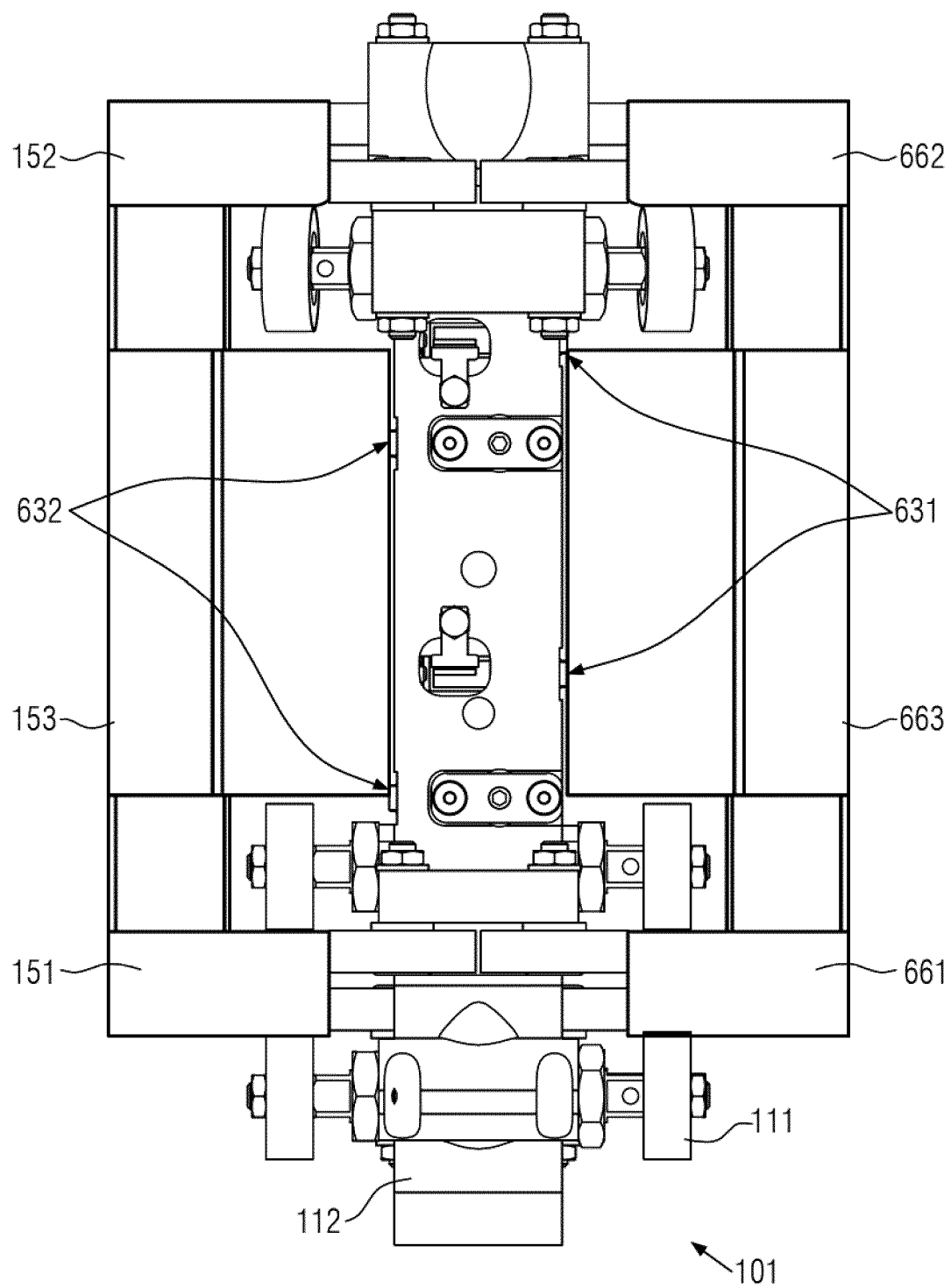

FIG. 6b shows a further embodiment in which the mover runs between two longitudinal stators 153 and 663. This situation normally occurs in the area of switches, with the aid of which the direction of movement of the mover can be changed and a division of a first conveying path into different conveying paths can be realized. Each of the longitudinal stators 153 and 663 has assigned thereto, above and below, respective guides 151 and 661 and 152 and 662, respectively, which are adapted to be engaged by the rollers 111 of the mover. In the embodiment shown in FIG. 6b, e.g. the mover according to FIG. 5 can be used, this mover having four distance meters as a sensor in the accommodating area. In the area of the switch, this kind of mover allows to measure the distance to both longitudinal stators 153 and 663 simultaneously, so as to determine the size of the air gap. In addition, deviations in the orientation of the longitudinal stators or guides relative to one another can be determined.

For the preceding embodiments, which make use of distance meters, it will be advantageous when a defined zero position of the distance meters can be determined. This can be accomplished, for example, by placing the mover on a horizontal plate that is as flat as possible, so that this plate will contact the area of the mover, which is also as flat as possible and in which the distance meters, in particular the sensing rollers, are arranged. The sensing rollers are then preloaded against this surface by the spring elements (cf. FIG. 5). This has the effect that they will inevitably contact this surface, and the setting of the distance meter at this position can then be specified as zero position. In order to prevent the mover from being pushed away from the plate by the preload of the spring elements (against the force of gravity), a small contact force acting in the direction of the flat surface can be applied to the mover in its entirety from the opposite side of the mover. This contact force can be selected to have a magnitude of precisely such a nature that the preload of the spring elements that endeavors to push the mover away from the flat plate on which it rests and that is already partially compensated by the weight of the mover, which rests on the flat plate and the weight of which acts in the direction of the flat plate, is compensated for as fully as possible.

In the embodiments according to FIGS. 2 and 3, in which the sensor essentially measures the magnetic force between the longitudinal stator and the mover or its secondary part, it will also be necessary to determine a zero position. This is particularly necessary in view of the fact that the use of the load cell may lead to minor displacements of the secondary element when the magnetic force is applied, so that the size of the air gap between the longitudinal stator and the mover will change, a circumstance which, in the final analysis, will also have an effect on the magnetic force which acts on the secondary element and is thus measured. Here, a calibration and a compensation, respectively, can be provided, so as to obtain a realistic result for the measured magnetic force.

To begin with, a standard mover can be used, in the accommodating area of which the normally used secondary part is mounted, which is not movable relative to the mover. This can be accomplished e.g. by fixedly screwing the secondary part to the primary part in the accommodating area. The thus designed standard mover can then be placed on a force-pulling machine, so that the secondary parts face upwards and downwards, respectively. The movable end of the pulling machine has fixed thereto a ferromagnetic steel plate and at a large distance of this plate from the secondary parts and the standard shuttle, respectively, the force of the pulling machine is set to zero. Subsequently, the movable part of the pulling machine with the ferromagnetic steel plate can move in the direction of the standard mover. At distances of a few millimeters, which are realistic for the measurement of the magnetic force, the geometric distance between the steel plate and the secondary part can now be measured step by step. This can be done e.g. by means of sensing pins, which may additionally be provided in a mover according to the embodiments of FIGS. 4 and 5. Since the secondary parts are made of a magnetic material, a force will act when the ferromagnetic steel plate approaches, and this force can now be recorded and stored with the distance e.g. in an electronic evaluation unit.

Subsequently, the standard mover is replaced by a mover with a load cell and a suitable secondary element. Alternatively, also the same primary part may be used, but the secondary parts are replaced by the load cell and the secondary element or, more generally, by the sensor. Subsequently, the steel plate is moved towards the mover in accordance with the force profile that has previously been determined for the standard shuttle, and the force values obtained at the respective distances are stored. By subsequently subtracting the values ascertained for the standard shuttle and the values ascertained for the mover provided with a sensor, a compensation function can be derived, with the aid of which the movement of the secondary element relative to the mover, which will inevitably take place when a magnetic force is applied, can be compensated.

During operation of the mover with the sensor for determining the magnetic force, the compensation function can then be subtracted from the respective values measured, so as to obtain realistic values for the magnetic force actually acting on the mover, and this will improve the accuracy of the magnetic force ascertained.

The invention claimed is:

1. A mover for a longitudinal stator system, comprising a primary part with elements for movably arranging the mover on a longitudinal stator and an accommodating area, in which a sensor for position-dependent measurement of at least one system parameter is arranged, the sensor being releasably connected to the accommodating area, wherein the sensor comprises a load cell, which is connected to the mover in a stationary manner, and a secondary element corresponding to a secondary part of the mover as regards its geometry and/or a magnetic force exchangeable with the longitudinal stator during operation, wherein the load cell is able to measure a force acting on the secondary element when the mover moves along the longitudinal stator under an influence of a magnetic force.

2. The mover according to claim 1, wherein the position of the load cell relative to the primary part can be adjusted by means of adjustment elements.

3. The mover according to claim 1, wherein, in a condition in which the mover is arranged on the longitudinal stator, distance between the mover and the longitudinal stator perpendicular to a plane of movement of the mover along the longitudinal stator corresponds to a nominal distance between the mover with an installed secondary part and the longitudinal stator.

4. The mover according to claim 3, wherein the load cell is configured for measuring, in both directions perpendicular to the plane of movement of the mover along the longitudinal stator, a force acting on the secondary element.

5. The mover according to claim 1, wherein the sensor comprises a distance meter for measuring the distance between the mover and the longitudinal stator perpendicular to the plane, in which the mover can move along the longitudinal stator during operation.

6. The mover according to claim 5, wherein the distance meter comprises one of:
one or a plurality of sensing rollers and/or
one or a plurality of sensing pins.

7. The mover according to claim 1, wherein the mover comprises a position determination system, which is configured for determining a position of the mover along the longitudinal stator.

8. The mover according to claim 1, further comprising an evaluation electronics for processing at least measurement values recorded by the sensor.

9. A method for determining a system parameter of a longitudinal stator system, wherein a mover comprising a primary part with elements for movably arranging the mover on a longitudinal stator and an accommodating area, in which a sensor for position-dependent measurement of the system parameter is arranged, wherein the sensor is releasably connected to the accommodating area, on the longitudinal stator and wherein the method comprises the sensor measuring at least one system parameter while the mover is arranged on the longitudinal stator, wherein the sensor comprises a load cell, which is connected to the mover in a stationary manner, and a secondary element corresponding to a secondary part of the mover as regards its geometry and/or a magnetic force exchangeable with the longitudinal stator during operation, wherein the load cell measures a force acting on the secondary element when the mover moves along the longitudinal stator under the influence of a magnetic force.

10. The method according to claim 9, wherein the sensor measures the system parameter while the mover is moving along the longitudinal stator.

11. The method according to claim 9, wherein the sensor measures the distance between the mover and the longitudinal stator by means of a distance meter for measuring the distance between the mover and the longitudinal stator perpendicular to the plane in which the mover moves along the longitudinal stator.

12. The method according to claim 9, wherein values for the system parameter measured by the sensor are processed by means of an evaluation electronics of the mover.

13. The method according to claim 9, wherein the position of the mover during a movement along the longitudinal stator is determined by means of a position determination system.

* * * * *